US012680859B2

(12) United States Patent
Buttler et al.

(10) Patent No.: US 12,680,859 B2
(45) Date of Patent: Jul. 14, 2026

(54) DETERMINING A ZERO-VERIFICATION CRITERIA FOR A ZERO VERIFICATION OF A VIBRATORY METER

(71) Applicant: MICRO MOTION, INC., Boulder, CO (US)

(72) Inventors: Marc Allan Buttler, Erie, CO (US); Andrew Timothy Patten, Boulder, CO (US)

(73) Assignee: MICRO MOTION, INC., Boulder, CO (US)

( * ) Notice: Subject to any disclaimer, the term of this patent is extended or adjusted under 35 U.S.C. 154(b) by 295 days.

(21) Appl. No.: 18/560,564

(22) PCT Filed: Jun. 2, 2021

(86) PCT No.: PCT/US2021/035364
§ 371 (c)(1),
(2) Date: Nov. 13, 2023

(87) PCT Pub. No.: WO2022/256000
PCT Pub. Date: Dec. 8, 2022

(65) Prior Publication Data
US 2024/0247969 A1      Jul. 25, 2024

(51) Int. Cl.
*G01F 25/10*      (2022.01)
*G01F 1/84*      (2006.01)

(52) U.S. Cl.
CPC ............ *G01F 25/10* (2022.01); *G01F 1/8436* (2013.01)

(58) Field of Classification Search
CPC ......... G01F 25/10; G01F 1/8436; G01P 21/00

USPC ......... 73/1.16, 1.34, 1.38, 861.354–861.357, 73/497, 504.02, 504.12–504.16, 514.29; 702/45, 87, 96, 100, 106
See application file for complete search history.

(56) References Cited

U.S. PATENT DOCUMENTS

| | | | |
|---|---|---|---|
| 6,092,409 A | 7/2000 | Patten et al. | |
| 9,400,203 B2 | 7/2016 | Patten et al. | |

(Continued)

FOREIGN PATENT DOCUMENTS

| | | | | |
|---|---|---|---|---|
| CA | 2543262 C | * | 8/2013 | ............. G01F 25/10 |
| JP | 2005000723 A | * | 1/2005 | ....... H01L 21/67017 |

(Continued)

OTHER PUBLICATIONS

Stan Calame, Fundamentals of Coriolis Meters AGA Report No. 11, Second edition of AGA Report No. 11, Measurement of Natural Gas by Coriolis Meter, Prepared by Transmission Measurement Committee, Feb. 2013, pp. 1-11.

(Continued)

*Primary Examiner* — Robert R Raevis
(74) *Attorney, Agent, or Firm* — The Ollila Law Group LLC

(57) ABSTRACT
A meter electronics (20) for determining a zero-verification criteria for a zero-verification of a vibratory meter (5) is provided. The meter electronics (20) comprises an interface (401) communicatively coupled to a sensor assembly (10) containing a fluid and a processing system (402) communicatively coupled to the interface (401). The processing system (402) is configured to determine a property of the fluid and determine, based on the property of the fluid, a zero-verification criteria value for the sensor assembly (10).

18 Claims, 7 Drawing Sheets

(56)                    References Cited

U.S. PATENT DOCUMENTS

| | | |
|---|---|---|
| 2001/0045134 A1 | 11/2001 | Henry et al. |
| 2012/0055229 A1 | 3/2012 | Pankratz et al. |
| 2014/0137626 A1* | 5/2014 | Patten .................... G01F 1/8436 |
| | | 73/1.16 |
| 2019/0234784 A1 | 8/2019 | Patten |
| 2020/0249063 A1 | 8/2020 | Greco |
| 2024/0247961 A1* | 7/2024 | Buttler .................... G01F 25/10 |
| 2024/0247969 A1* | 7/2024 | Buttler .................... G01F 25/10 |

FOREIGN PATENT DOCUMENTS

| | | |
|---|---|---|
| WO | 2013002759 A1 | 1/2013 |
| WO | 2015112296 A1 | 7/2015 |
| WO | 2016064488 A1 | 4/2016 |
| WO | 2018067128 A1 | 4/2018 |
| WO | 2018174841 A1 | 9/2018 |
| WO | 2022255999 A1 | 12/2022 |

OTHER PUBLICATIONS

Tom O'Banion et al., Fundamentals of Coriolis Meters (For Gas Measurement), 2001 Proceedings, American School of Gas Measurement Technology, pp. 37-64.

Seth Harris, Coriolis Meter Overview, Emerson Coriolis Training, 2017, pp. 1-62.

Micro Motion Model 5700 Transmitters with MVD Technology, Product Data Sheet, PS-001885, Rev G, Nov. 2017, www.micromotion.com, pp. 1-32.

Reference Guide, MC-001597 Rev E, Elite Coriolis Flow Meters, Guidelines for the Selection and Operation of Provers with Micro Motion ELITE Coriolis Flow Meters, Jan. 2018, pp. 1-6.

Karl Stappert, Coriolis Mass Flow Meters For Natural Gas Measurement, Measurement of Natural Gas by Coriolis Meter, 2011, pp. 1-11.

Marc Buttler, Simplicity Meets Flexibility: Calibration Options for Coriolis Flowmeters, Emerson Automation Experts Blog, Apr. 28, 2021, https://www.emersonautomationexperts.com/2015/measurement-instrumentation/flow/simplicity-meets-flexibility-calibration-options-for-coriolis-flowmeters/, pp. 1-6.

Micro Motion Coriolis Oil & Gas Metering Recommended Practices for Upstream Allocation, GI-002093 Rev A, 2017, www.emerson.com, white-paper-coriolis-oil-gas-metering-best-practices-for-upstream-allocation-micro-motion-en-us-177344, pp. 1-8.

Kevin Finnan, What is AGA 11 and How is it Implemented in Software?, Application Data Document, 415AD-55a, Jul. 30, 2007, www.EmersonProcess.com/Remote, white-paper-what-aga-11-how-it-implemented-ras-en-133728, pp. 1-3.

* cited by examiner

700

DETERMINING A ZERO-VERIFICATION CRITERIA FOR A ZERO VERIFICATION OF A VIBRATORY METER

TECHNICAL FIELD

The embodiments described below relate to verifying an operation of a vibratory meter and, more particularly, to determining a zero-verification criteria for a zero verification of the vibratory meter.

BACKGROUND

Vibratory meters, such as for example, Coriolis mass flowmeters, liquid density meters, gas density meters, liquid viscosity meters, gas/liquid specific gravity meters, gas/liquid relative density meters, and gas molecular weight meters, are generally known and are used for measuring properties of fluids. Generally, vibratory meters comprise a sensor assembly and a meter electronics. The material within the sensor assembly may be flowing or stationary. The vibratory meter may be used to measure a mass flow rate, density, or other properties of a material in the sensor assembly.

To measure such fluid properties of the material, the vibratory meter may need to use a reference zero-flow value. The reference zero-flow value may be equivalent to a zero-flow value of the measured property. An actual non-zero property may be quantified as a scaled or non-scaled difference from the reference zero-flow value. As can be appreciated, an accurate measurement of the actual non-zero property may depend on an accurate reference zero-flow value. An accurate reference zero-flow value may be determined with a zero calibration. The accuracy of the reference zero-flow value may be verified with a zero verification. The zero calibration and zero verification may be performed by fluidly isolating the vibratory meter such that any measurements can correctly be assumed to reflect a property having a zero-flow value (e.g., zero flow rate).

FIG. 1 shows a system 1 capable of performing a zero verification and a zero calibration of a vibratory meter 5. As shown in FIG. 1, the system 1 is comprised of a meter inlet block valve 2a and a meter outlet block valve 2b. The meter inlet and outlet block valves 2a, 2b are configured to prevent a flow of a fluid. Accordingly, the flow of the fluid through the vibratory meter 5 may be zero. Also shown is a fluid bypass loop 3 comprised of a bypass inlet pipe 3a, a bypass block valve 3b, and a bypass outlet pipe 3c. The bypass inlet pipe 3a, bypass block valve 3b, and bypass outlet pipe 3c are configured to allow the fluid to bypass the vibratory meter 5 if the bypass block valve 3b is open. Upstream from the vibratory meter 5 is a blowdown valve port 4a and a thermo well port 4b.

During a zero verification and zero calibration, the meter inlet and outlet block valves 2a, 2b are closed thereby preventing the flow of the fluid through the vibratory meter 5. This may be referred to as a zero-flow condition of the vibratory meter 5. During the zero verification and zero calibration, the vibratory meter 5 may measure one or more zero-flow values, which may be values associated with the zero flow rate of the fluid. In Coriolis meters, the zero-flow value may be a time delay or a phase difference between sensor signals when the vibratory meter 5 is in the zero-flow condition.

The vibratory meter 5 may use a reference zero-flow value to calculate a flow rate of the fluid through the vibratory meter 5. During zero calibration, the vibratory meter 5 may determine one or more zero-flow values that can be used to calculate the reference value. During zero-verification, the vibratory meter 5 may compare one or more zero-flow values to a criterion to determine if the reference zero-flow value can be used to calculate the flow rate of the fluid. If the reference zero-flow value is not acceptable, then the zero calibration may be performed.

A previously determined reference zero-flow value may be compared to the one or more zero-flow values to determine if the reference zero-flow value may be used to calculate a flow rate of the fluid. Such a comparison may employ a zero-verification criteria to determine if a zero calibration should be performed. However, the zero-verification criteria may not be suitable for a particular process. In addition, various processes may be employed at a location, which may require varying degrees of accuracy in flow rate measurements. Accordingly, there is a need for determining a zero-verification criteria for the zero verification of a vibratory meter.

SUMMARY

A meter electronics for determining a zero-verification criteria for a zero-verification of a vibratory meter is provided. According to an embodiment, the meter electronics comprises an interface communicatively coupled to a sensor assembly containing a fluid and a processing system communicatively coupled to the interface. The processing system is configured to determine a property of the fluid and determine, based on the property of the fluid, a zero-verification criteria value for the sensor assembly.

A method of determining a zero-verification criteria for a zero verification of a vibratory meter is provided. According to an embodiment, the method comprises containing a fluid in a sensor assembly, determining a property of the fluid, and determining, based on the property of the fluid, a zero-verification criteria value for the sensor assembly.

A vibratory meter capable of determining a zero-verification criteria for performing a zero verification is provided. According to an embodiment, the vibratory meter comprises a sensor assembly containing a fluid and the meter electronics communicatively coupled to the sensor assembly.

Aspects

According to an aspect, a meter electronics for determining a zero-verification criteria for a zero-verification of a vibratory meter, the meter electronics comprises an interface communicatively coupled to a sensor assembly containing a fluid and a processing system communicatively coupled to the interface. The processing system is configured to determine a property of the fluid and determine, based on the property of the fluid, a zero-verification criteria value for the sensor assembly.

Preferably, the processing system being configured to determine the property of the fluid comprises the processing system being configured to measure the property of the fluid while the fluid is contained within the sensor assembly in a no-flow condition.

Preferably, the property of the fluid is one of a density and a phase of a fluid.

Preferably, the processing system being configured to determine the zero-verification criteria value comprises the processing system being configured to determine a first zero-verification criteria value by multiplying a second zero-verification criteria value with a factor.

Preferably, the factor is a ratio determined based on a first tolerance associated with a first expected flow rate of the fluid and a second tolerance associated with a second expected flow rate of the fluid.

Preferably, the zero-verification criteria value is at least one of a bias indicator reliability threshold value and a zero-stability value of a reference zero-flow value.

According to an aspect, a method of determining a zero-verification criteria for a zero verification of a vibratory meter comprises containing a fluid in a sensor assembly, determining a property of the fluid, and determining, based on the property of the fluid, a zero-verification criteria value for the sensor assembly.

Preferably, the property of the fluid is a measured property of the fluid while the fluid is contained within the sensor assembly in a no-flow condition.

Preferably, the property of the fluid is one of a density and a phase of a fluid.

Preferably, the zero-verification criteria value is a first zero-verification criteria value determined by multiplying a second zero-verification criteria value with a factor.

Preferably, the factor is a ratio determined based on a first tolerance associated with a first expected flow rate of the fluid and a second tolerance associated with a second expected flow rate of the fluid.

Preferably, the zero-verification criteria value is at least one of a bias indicator reliability threshold value and a zero-stability value of a reference zero-flow value.

According to an aspect, a vibratory meter capable of determining a zero-verification criteria for performing a zero verification, the vibratory meter comprises a sensor assembly containing a fluid and the meter electronics communicatively coupled to the sensor assembly.

BRIEF DESCRIPTION OF THE DRAWINGS

The same reference number represents the same element on all drawings. It should be understood that the drawings are not necessarily to scale.

DETAILED DESCRIPTION

FIGS. 1-7 and the following description depict specific examples to teach those skilled in the art how to make and use the best mode of embodiments of determining a zero-verification criteria for zero verification of a vibratory meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of determining the zero-verification criteria for the zero verification of a vibratory meter. As a result, the embodiments described below are not limited to the specific examples described below, but only by the claims and their equivalents.

Figure 2:
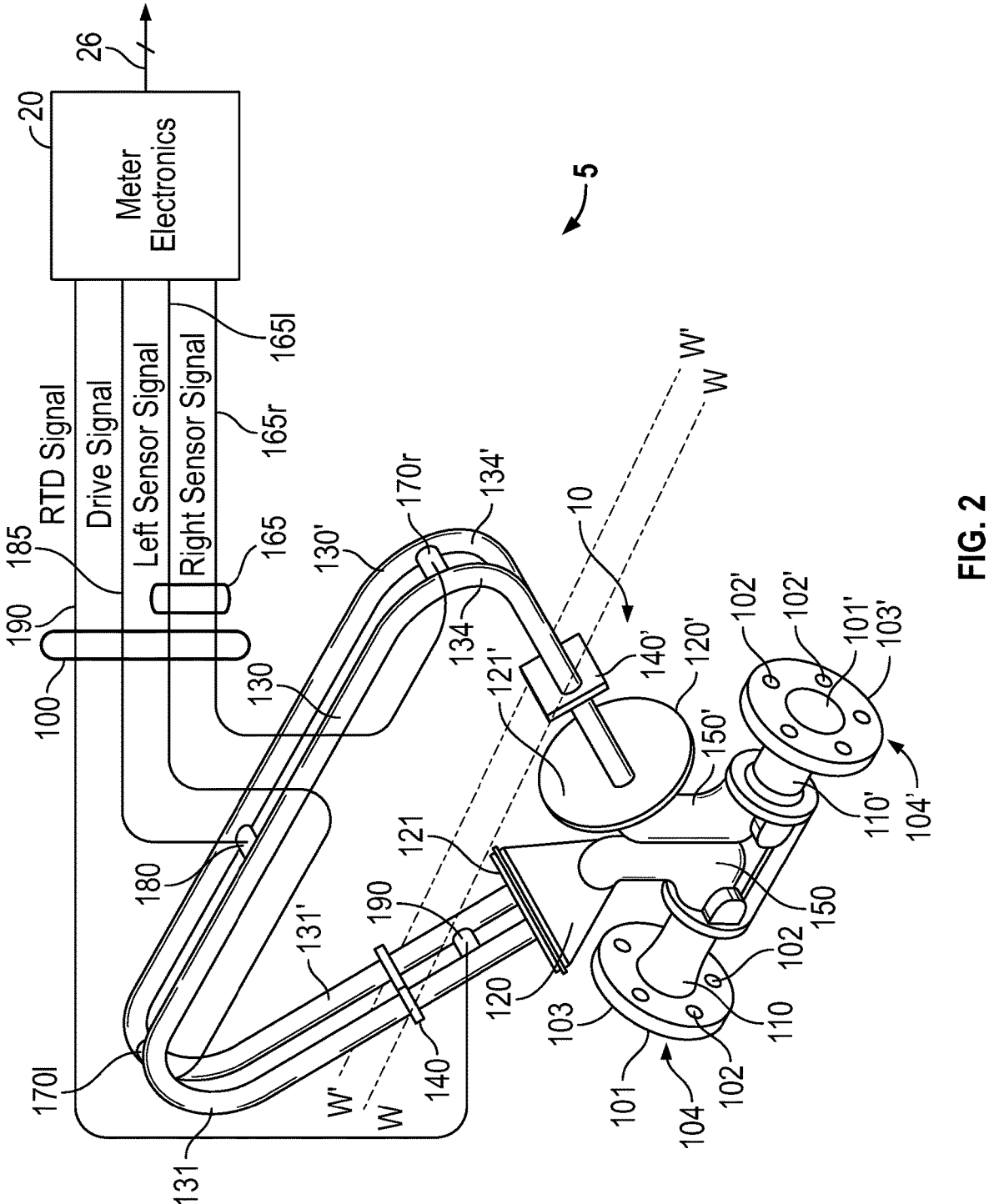
FIG. 2 shows a vibratory meter 5 configured to determine a zero-verification criteria for zero verification of the vibratory meter 5.

FIG. 2 shows a vibratory meter 5 configured to determine a zero-verification criteria for zero verification of the vibratory meter 5. As shown in FIG. 2, the vibratory meter 5 comprises a sensor assembly 10 and meter electronics 20. The sensor assembly 10 responds to mass flow rate and density of a process material. The meter electronics 20 is connected to the sensor assembly 10 via leads 100 to provide density, mass flow rate, and temperature information over port 26, as well as other information.

The sensor assembly 10 includes a pair of manifolds 150 and 150', flanges 103 and 103' having flange necks 110 and 110', a pair of parallel conduits 130 and 130', driver 180, resistive temperature detector (RTD) 190, and a pair of pick-off sensors 170l and 170r. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through sensor assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by driver 180 in opposite directions about their respective bending axes W and W' and at what is termed the first out-of-phase bending mode of the vibratory meter. This driver 180 may comprise any one of many well-known arrangements, such as a magnet mounted to the conduit 130' and an opposing coil mounted to the conduit 130 and through which an alternating current is passed for vibrating both conduits 130, 130'. A suitable drive signal 185 is applied by the meter electronics 20, via a lead, to the driver 180.

The meter electronics 20 receives the RTD temperature signal on lead 195, and sensor signals 165 appearing on leads 100 carrying left and right sensor signals 165l, 165r, respectively. The meter electronics 20 produces the drive signal 185 appearing on the lead to driver 180 and vibrate conduits 130, 130'. The meter electronics 20 processes the left and right sensor signals 165l, 165r and the RTD signal 195 to compute the mass flow rate and the density of the material passing through sensor assembly 10. This information, along with other information, is applied by meter electronics 20 over path 26 as a signal. A more detailed discussion of the meter electronics 20 follows.

Figure 3:
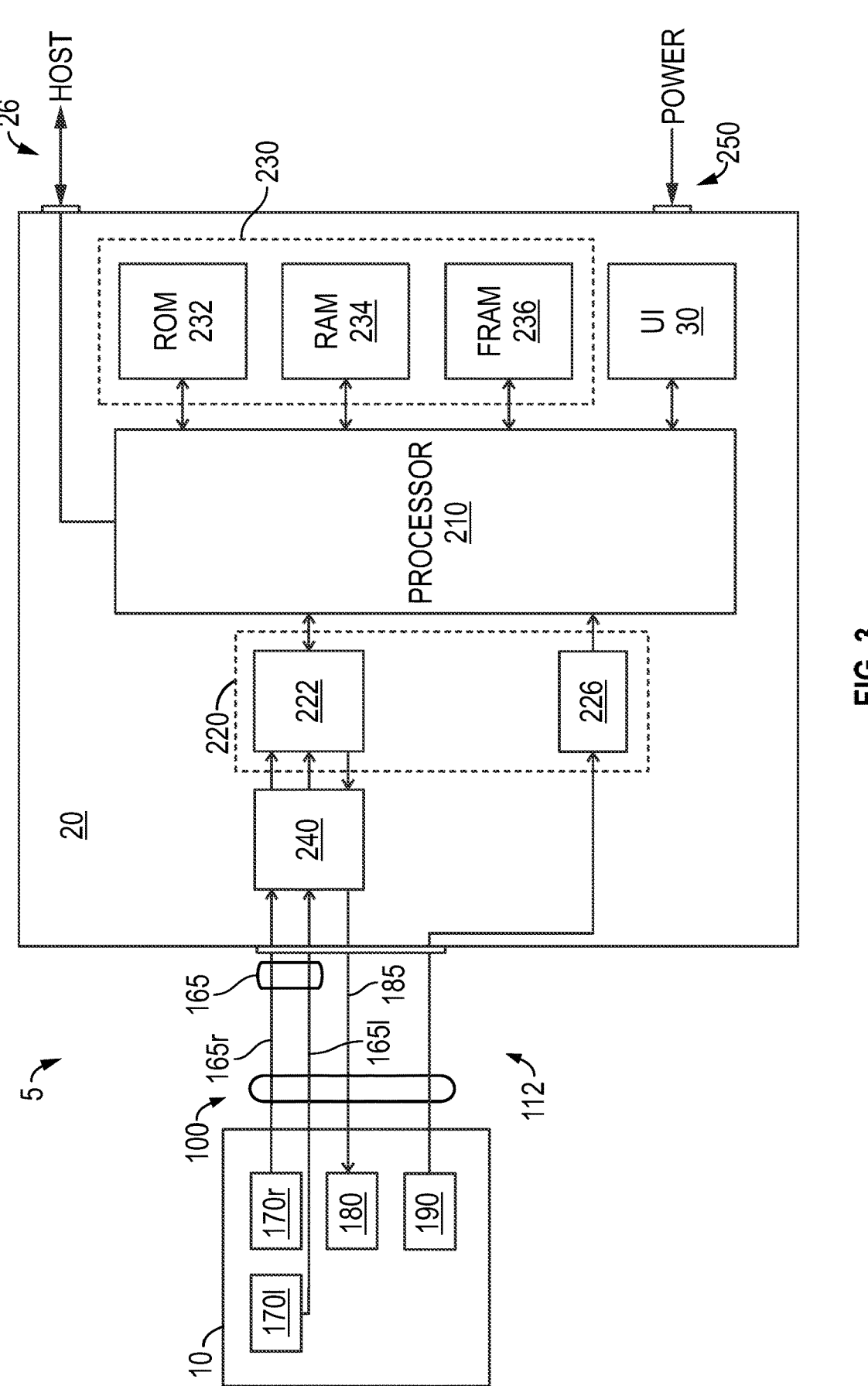
FIG. 3 shows a block diagram of the vibratory meter 5, including a block diagram representation of the meter electronics 20, configured to determine a zero-verification criteria for zero verification of the vibratory meter 5.

FIG. 3 shows a block diagram of the vibratory meter 5, including a block diagram representation of the meter electronics 20, configured to determine a zero-verification criteria for zero verification of the vibratory meter 5. As shown in FIG. 3, the meter electronics 20 is communicatively coupled to the sensor assembly 10. As described in the foregoing with reference to FIG. 2, the sensor assembly 10 includes the left and right pick-off sensors 170l, 170r, driver 180, and temperature sensor 190, which are communicatively coupled to the meter electronics 20 via the set of leads 100 through a communications channel 112.

The meter electronics 20 provides a drive signal 185 via the leads 100. More specifically, the meter electronics 20 provides a drive signal 185 to the driver 180 in the sensor assembly 10. In addition, sensor signals 165 comprising the left sensor signal 165l and the right sensor signal 165r are provided by the sensor assembly 10. More specifically, in the embodiment shown, the sensor signals 165 are provided by the left and right pick-off sensor 170l, 170r in the sensor assembly 10. As can be appreciated, the sensor signals 165 are respectively provided to the meter electronics 20 through the communications channel 112.

The meter electronics 20 includes a processor 210 communicatively coupled to one or more signal processors 220 and one or more memories 230. The processor 210 is also communicatively coupled to a user interface 30. The processor 210 is communicatively coupled with the host via a communication port over the port 26 and receives electrical power via an electrical power port 250. The processor 210 may be a microprocessor although any suitable processor may be employed. For example, the processor 210 may be comprised of sub-processors, such as a multi-core processor, serial communication ports, peripheral interfaces (e.g., serial peripheral interface), on-chip memory, I/O ports, and/or the like. In these and other embodiments, the processor 210 is configured to perform operations on received and processed signals, such as digitized signals.

The processor 210 may receive digitized sensor signals from the one or more signal processors 220. The processor 210 is also configured to provide information, such as a phase difference, a property of a fluid in the sensor assembly 10, or the like. The processor 210 may provide the information to the host through the communication port. The processor 210 may also be configured to communicate with the one or more memories 230 to receive and/or store information in the one or more memories 230. For example, the processor 210 may receive calibration factors and/or sensor assembly zeros (e.g., phase difference when there is zero flow) from the one or more memories 230.

Each of the calibration factors and/or sensor assembly zeros may respectively be associated with the vibratory meter 5 and/or the sensor assembly 10. The processor 210 may use the calibration factors to process digitized sensor signals received from the one or more signal processors 220.

The one or more signal processors 220 is shown as being comprised of an encoder/decoder (CODEC) 222 and an analog-to-digital converter (ADC) 226. The one or more signal processors 220 may condition analog signals, digitize the conditioned analog signals, and/or provide the digitized signals. The CODEC 222 is configured to receive the sensor signals 165 from the left and right pick-off sensors 170l, 170r. The CODEC 222 is also configured to provide the drive signal 185 to the driver 180. In alternative embodiments, more or fewer signal processors may be employed.

As shown, the sensor signals 165 are provided to the CODEC 222 via a signal conditioner 240. The drive signal 185 is provided to the driver 180 via the signal conditioner 240. Although the signal conditioner 240 is shown as a single block, the signal conditioner 240 may be comprised of signal conditioning components, such as two or more op-amps, filters, such as low pass filters, voltage-to-current amplifiers, or the like. For example, the sensor signals 165 may be amplified by a first amplifier and the drive signal 185 may be amplified by the voltage-to-current amplifier. The amplification can ensure that the magnitude of the sensor signals 165 is approximate the full-scale range of the CODEC 222.

In the embodiment shown, the one or more memories 230 is comprised of a read-only memory (ROM) 232, random access memory (RAM) 234, and a ferroelectric random-access memory (FRAM) 236. However, in alternative embodiments, the one or more memories 230 may be comprised of more or fewer memories. Additionally, or alternatively, the one or more memories 230 may be comprised of different types of memory (e.g., volatile, non-volatile, etc.). For example, a different type of non-volatile memory, such as, for example, erasable programmable read only memory (EPROM), or the like, may be employed instead of the FRAM 236. The one or more memories 230 may be a storage configured to store process data, such as drive or sensor signals, mass flow rate or density measurements, etc.

A mass flow rate measurement can be generated according to the equation:

$$\dot{m} = FCF[\Delta t - \Delta t_0]; \tag{1}$$

where:
    $\dot{m}$ is a measured mass flow rate;
    FCF is a flow calibration factor;
    $\Delta t$ is a measured time delay; and
    $\Delta t_0$ is a zero-flow time delay.

The measured time delay $\Delta t$ comprises an operationally-derived (i.e., measured) time delay value comprising the time delay existing between the pickoff sensor signals, such as where the time delay is due to Coriolis effects related to mass flow rate through the vibratory meter 5. The measured time delay $\Delta t$ is a direct measurement of a mass flow rate of the flow material as it flows through the vibratory meter 5. The zero-flow time delay $\Delta t_0$ comprises a time delay at a zero flow. The zero-flow time delay $\Delta t_0$ is a zero-flow value that may be determined at the factory and programmed into the vibratory meter 5. The zero-flow time delay $\Delta t_0$ is an exemplary zero-flow value. Other zero-flow values may be employed, such as a phase difference, time difference, or the like, that are determined at zero flow conditions. A value of the zero-flow time delay $\Delta t_0$ may not change, even where flow conditions are changing. A mass flow rate value of the material flowing through the vibratory meter 5 is determined by multiplying a difference between measured time delay $\Delta t$ and a reference zero-flow value $\Delta t_0$ by the flow calibration factor FCF. The flow calibration factor FCF is proportional to a physical stiffness of the vibratory meter.

As to density, a resonance frequency at which each conduit 130, 130' may vibrate may be a function of the square root of a spring constant of the conduit 130, 130' divided by the total mass of the conduit 130, 130' having a material. The total mass of the conduit 130, 130' having the material may be a mass of the conduit 130, 130' plus a mass of a material inside the conduit 130, 130'. The mass of the material in the conduit 130, 130' is directly proportional to the density of the material. Therefore, the density of this material may be proportional to the square of a period at which the conduit 130, 130' containing the material oscillates multiplied by the spring constant of the conduit 130, 130'. Hence, by determining the period at which the conduit 130, 130' oscillates and by appropriately scaling the result, an accurate measure of the density of the material contained by the conduit 130, 130' can be obtained. The meter electronics 20 can determine the period or resonance frequency using the sensor signals 165 and/or the drive signal 185. The conduits 130, 130' may oscillate with more than one vibration mode.

Calibration

The vibratory meter 5 may be calibrated with a factory zero-flow value while the vibratory meter 5 is in a no or zero-flow condition. A user, at any time, may additionally, and optionally, perform a push-button calibration to obtain a push-button zero-flow value. Additionally or alternatively, the vibratory meter may automatically perform a calibration to obtain an automatic zero-flow value. The zero-flow value used to measure a flow rate of a fluid may be the factory zero-flow value, a push-button zero-flow value, the automatic zero-flow value, or any other suitable zero-flow value.

Measurements, saved values/constants, user settings, saved tables, etc., may be employed during the zero calibration of the vibratory meter 5. The calibration may monitor the flowmeter conditions of the vibratory meter 5 and compensate for those conditions. The conditions may include user-input conditions, measured conditions, inferred conditions, or the like, without limitation. The conditions may include temperature, fluid density, flow rate, meter specifications, viscosity, Reynold's number, post calibration compensation, etc. In addition, different constants, such as a flow calibration factor (FCF), for example without limitation, may be applied based on operating conditions or user preference.

An initial zero-flow value may be determined during a calibration conducted as part of the initial factory setup of the vibratory meter 5. This may entail placing the vibratory meter 5 in a no or zero-flow condition and determining a time delay, phase difference, or the like, between the left and right sensor signals 165l, 165r. The determined value is stored in one or more memories 230 as the initial zero-flow value and used as a reference zero-flow value. By way of example, for equation [1] discussed above, the reference zero-flow value may be the $\Delta T_0$ term, which may be a no or zero-flow time delay between the left and right sensor signals 165l, 165r. Once the reference zero-flow value is determined, the flow calibration factor (FCF) may be established, which, as can be appreciated from above equation [1], may be a slope of a line that dictates the relationship between the measured time delay $\Delta t_{measured}$ and the mass flow rate ṁ. The FCF may be stored in the one or more memories 230.

Zero Verification

Zero verification may comprise comparing a new zero-flow value to the reference zero-flow value. For example, a new zero-flow value may be compared to a zero-flow value determined at the factory (e.g., a factory zero-flow value), although any suitable reference zero-flow value may be employed. The new zero-flow value may be determined by, for example, averaging a plurality of zero-flow value measurements made while the vibratory meter 5 is installed in a process line but fluidly isolated as described above with reference to FIG. 1.

Comparing the new zero-flow value with the reference zero-flow value may include comparing the plurality of zero-flow value measurements to the reference zero-flow value. If the plurality of zero-flow value measurements are not within a tolerance (e.g., "predetermined bounds", "zero-stability value", or the like) of the reference zero-flow value, then the reference zero-flow value may no longer be valid and the new zero-flow value may be stored as a reference zero-flow value. If the new zero-flow value is within the tolerance of the reference zero-flow value, then the reference zero-flow value may be valid and the new zero-flow value may or may not be stored as a reference zero-flow value.

However, the tolerance of the reference zero-flow value may be based on a calibration of the vibratory meter 5 at factory conditions, which may not be suitable for all processes. Also, after installation, the vibratory meter 5 is subject to mounting, operational, and/or process conditions which may be different and more specialized than the factory conditions. For example, the mounting conditions may cause a relatively small shift (e.g., within the tolerance of the reference zero-flow value) in an actual zero-flow time delay of the conduits 130, 130'. Additionally, the process in which the vibratory meter 5 is employed may have a mass flow rate measurement tolerance that requires a more stringent tolerance of a reference zero-value.

Accordingly, the reference zero-flow value may be invalid for a process even if the zero-flow value measurements are within the tolerance of the reference zero-flow value. For example, the reference zero-flow value may be invalid if a bias indicator of the reference zero-flow value shows that the reference zero-flow value causes a measurement bias that causes the flow rate measurement values to be outside a tolerance of flow rate measurements. This determination and evaluation of the bias indicator of the reference zero-flow value may be performed in addition to or alternative to determining if the plurality of zero-flow value measurements is within the tolerance of the reference zero-flow value.

The bias indicator of the reference zero-flow value may be any indicator that can prove the reference zero-flow value causes a measurement bias. For example, the bias indicator may be comprised of a central tendency value and a dispersion value associated with the zero-flow value measurements. The central tendency value may be a mean of the zero-flow value measurements and the dispersion value may be a standard deviation of the new zero-flow value measurements. In another example, the bias indicator may be a ratio of positive or negative values (e.g., a signum ratio) of a difference between the new zero-flow value measurements and the reference zero-flow value to the total number of new zero-flow value measurements. However, any suitable bias indicator that can reliably show that the reference zero-flow value causes a measurement bias can be employed.

The zero verification may include the above and other zero-verification criteria depending on, for example, a particular process, type of fluid, or the like. For example, as discussed above, the vibratory meter 5 may measure a liquid or a gas. A zero-verification criteria for liquid may be different than a zero-verification criteria for gas. The zero-verification criteria may differ in their, for example, tolerances, thresholds, or the like, of the reference zero-flow value. Accordingly, the meter electronics 20 may be configured to select a zero-verification criteria.

Figure 4:
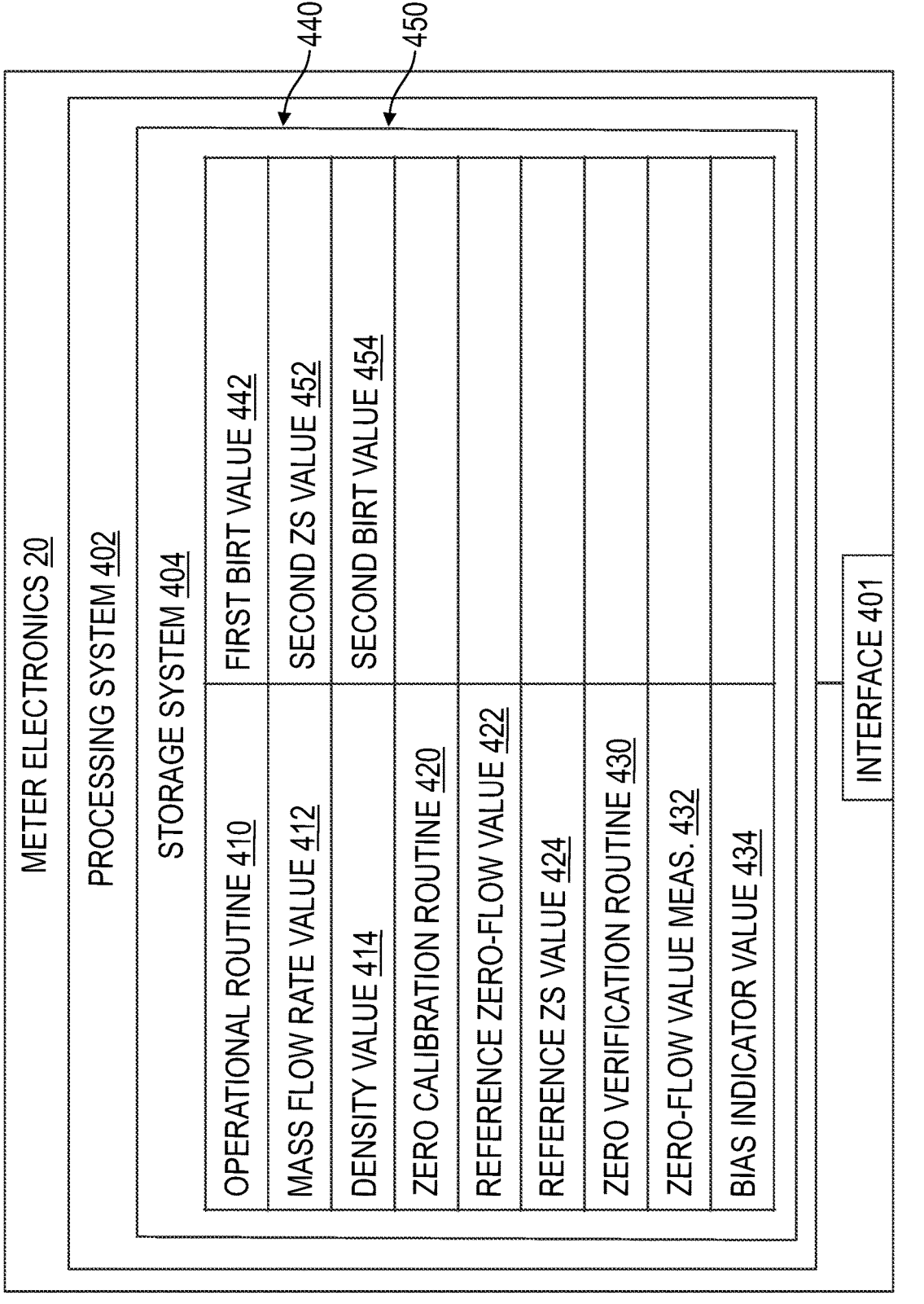
FIG. 4 shows a meter electronics 20 for determining a zero-verification criteria for zero verification of the vibratory meter 5.

FIG. 4 shows a meter electronics 20 for determining a zero-verification criteria for zero verification of the vibratory meter 5. As shown in FIG. 4, the meter electronics 20 includes an interface 401 and a processing system 402. The meter electronics 20 receives a vibrational response from a sensor assembly, such as the sensor assembly 10, for example. The meter electronics 20 processes the vibrational response in order to obtain flow properties of the flow material flowing through the sensor assembly 10. The meter electronics 20 may also perform checks, verifications, calibration routines, or the like, to ensure the flow properties of the flow material are accurately measured.

The interface 401 may receive the sensor signals 165 from one of the pick-off sensors 170*l*, 170*r* shown in FIGS. 2 and 3. The interface 401 can perform any necessary or desired signal conditioning, such as any manner of formatting, amplification, buffering, etc. Alternatively, some or all of the signal conditioning can be performed in the processing system 402. In addition, the interface 401 can enable communications between the meter electronics 20 and external devices. The interface 401 can be capable of any manner of electronic, optical, or wireless communication.

The interface 401 can provide information based on the vibrational response. The interface 401 may be coupled with a digitizer, such as the CODEC 222 shown in FIG. 3, wherein the sensor signal comprises an analog sensor signal. The digitizer samples and digitizes an analog sensor signal and produces a digitized sensor signal.

The processing system 402 conducts operations of the meter electronics 20 and processes flow measurements from the sensor assembly 10. The processing system 402 executes one or more processing routines and thereby processes the flow measurements in order to produce one or more flow properties. The processing system 402 is communicatively coupled to the interface 401 and is configured to receive the information from the interface 401.

The processing system 402 can comprise a general-purpose computer, a micro-processing system, a logic circuit, or some other general purpose or customized processing device. Additionally, or alternatively, the processing system 402 can be distributed among multiple processing devices. The processing system 402 can also include any manner of integral or independent electronic storage medium, such as the storage system 404.

The storage system 404 can store vibratory meter parameters and data, software routines, constant values, and variable values. In one embodiment, the storage system 404 includes routines that are executed by the processing system 402, such as an operational routine 410, zero-calibration routine 420, and zero-verification routine 430 of the vibratory meter 5. The storage system can also store statistical values, such as a mean, standard deviation, confidence interval, etc., or the like.

The operational routine 410 may determine a mass flow rate value 412 and a density value 414 based on the sensor signals received by the interface 401. The mass flow rate value 412 may be a frequency independent mass flow rate value, a directly measured mass flow rate value, or the like. For example, as described above, the mass flow rate may be determined using an equation that does not include frequency, or frequency dependent values, such as density. The mass flow rate value 412 may be determined from the sensor signals, such as a time delay between a left pickoff sensor signal and a right pickoff sensor signal. The density value 414 may also be determined from the sensor signals by, for example, determining a frequency from one or both of the left and right pickoff sensor signals.

The zero-calibration routine 420 may perform the zero verification described above and store an initial or factory zero as a reference zero-flow value 422. As discussed above, the reference zero-flow value 422 may be employed to calculate the mass flow rate value 412. The zero-calibration routine 420 may also determine and store a zero-stability value as a reference zero-stability value 424. Additionally or alternatively, the reference zero-flow value 422 and the reference zero-stability value 424 may be determined by a calibration routine that is stored and executed on an external device, such as a calibration platform at a factory performing an initial calibration on the vibratory meter 5.

The zero-verification routine 430 may verify that the reference zero-flow value 422 is acceptable by using, for example, the reference zero-stability value 424. For example, the zero-verification routine 430 may measure zero-flow values under no or zero-flow conditions of the vibratory meter 5 and store the measured zero-flow values as zero-flow value measurements 432. The zero-verification routine 430 may determine if the zero-flow value measurements 432 are within the reference zero-stability value 424.

Additionally or alternatively, the zero-verification routine 430 may determine a bias indicator value 434 of the reference zero-flow value 422. The bias indicator value 434 may indicate that the reference zero-flow value 422 can cause a measurement bias in the mass flow rate value 412. As discussed above, the bias indicator value 434 of the reference zero-flow value 422 may be comprised of a central tendency value and a dispersion value associated with the zero-flow value measurements 432. For example, the central tendency value may be a mean of a plurality of difference values between the zero-flow value measurements 432 and the reference zero-flow value 422 and the dispersion value may be a standard deviation of the plurality of differences about the mean.

The zero-verification routine 430 may also select a zero-verification criteria. For example, the zero-verification routine 430 may select a zero-verification criteria based on a property of a fluid contained by the sensor assembly 10. The zero-verification criteria may be comprised of the reference zero-stability value 424 and/or other values. For example, as shown in FIG. 4, a first zero-verification criteria 440 may include a first bias indicator reliability threshold value 442. Accordingly, the zero-verification routine 430 may determine if the zero-flow value measurements 432 are within the reference zero-stability value 424 and determine if a bias indicator value 434 is within the first bias indicator reliability threshold value 442. The first bias indicator reliability threshold value 442 can be, for example, a signum ratio of 75%, zero or a dead band around zero if a null hypothesis is used as described above, or the like.

The zero-verification routine 430 may also select a second zero-verification criteria 450 comprised of, for example, a second zero-stability value 452 and a second bias indicator reliability threshold value 454. The second zero-stability value 452 may not be the same as the reference zero-stability value 424. For example, the second zero-stability value 452 may be less than the reference zero-stability value 424. Accordingly, the second zero-stability value 452 may be employed when the vibratory meter 5 is used in processes that require a zero-stability value that is less than the reference zero-stability value 424.

By way of example, for non-custodial conveyance of liquids, the zero-verification routine 430 may determine if the zero-flow value measurements 432 are within the reference zero-stability value 424. For custodial transfer of a liquid, the zero-verification routine 430 may determine if the zero-flow value measurements 432 are within the reference zero-stability value 424 and the bias indicator value 434 is within the first bias indicator reliability threshold value 442. For custodial transfers of gas, the zero-verification routine 430 may determine if the zero-flow value measurements 432 are within the second zero-stability value 452 and the bias indicator value 434 is within the first bias indicator reliability threshold value 442. These are just examples and any suitable combination of tolerance or tolerances of the reference zero-flow value may be employed for any suitable property of the fluid.

The first and/or second bias indicator reliability threshold values 442, 454 may be user configurable. For example, a user may set the dead band around zero to achieve a desired zero-verification criteria for a particular application. Accordingly, a confidence interval value, which is described in more detail below, stored as a dispersion value of the bias indicator value 434 can be configured by the manufacturer and the user can configure the first and/or second bias indicator reliability threshold values 442, 454 that is compared to the dispersion value or, more particularly in this example, the confidence interval. By way of illustration, the manufacturer may set a two-sigma confidence interval value that can be compared to zero (i.e., no dead-band) for one application whereas for a more stringent application the user may set a dead band value that, when compared to a two-sigma confidence interval value, is comparable to a three-sigma confidence interval value compared to zero. With reference to the signum ratios, the user can set a signum ratio value as the bias indicator reliability threshold value. The signum ratio value may require fewer computing resources than comparing a confidence interval to a dead band to determine if a bias indicator is sufficiently reliable. The signum ratio can also correspond to a confidence interval. For example, a signum ratio value of 75% may correspond to a confidence level of about one-sigma or 68%. These and other values may be set and stored by the user as the first and/or second bias indicator reliability threshold values 442, 454 that are compared to the bias indicator value 434. The processing system 402 may also determine the first or second zero-verification criteria 440, 450. For example, the processing system 402 may calculate the second zero-stability value 452 from the reference zero-stability value 424. In one particular example, the second zero-stability value 452 may be calculated by multiplying the reference zero-stability value 424, for example, by 0.5 to scale the reference zero-stability value 424 to the second zero-stability value 452. Additionally or alternatively, the first and/or the second bias indicator reliability threshold values 442, 454 may be similarly calculated.

The ratio used to scale the first or second zero-verification criteria 440, 450 may be based on the property of the fluid. For example, the ratio may be a ratio of error bands associated with low or high expected flow rates of the fluid, whether the fluid is gas or liquid, whether the density of the fluid is greater than or less than a density threshold, or the like. In one specific example, the ratio may be determined by dividing the error band associated with an expected high flow rate of the fluid by the error band associated with the expected low flow rate of the fluid. This example is discussed below with reference to FIG. 5.

Figure 5:
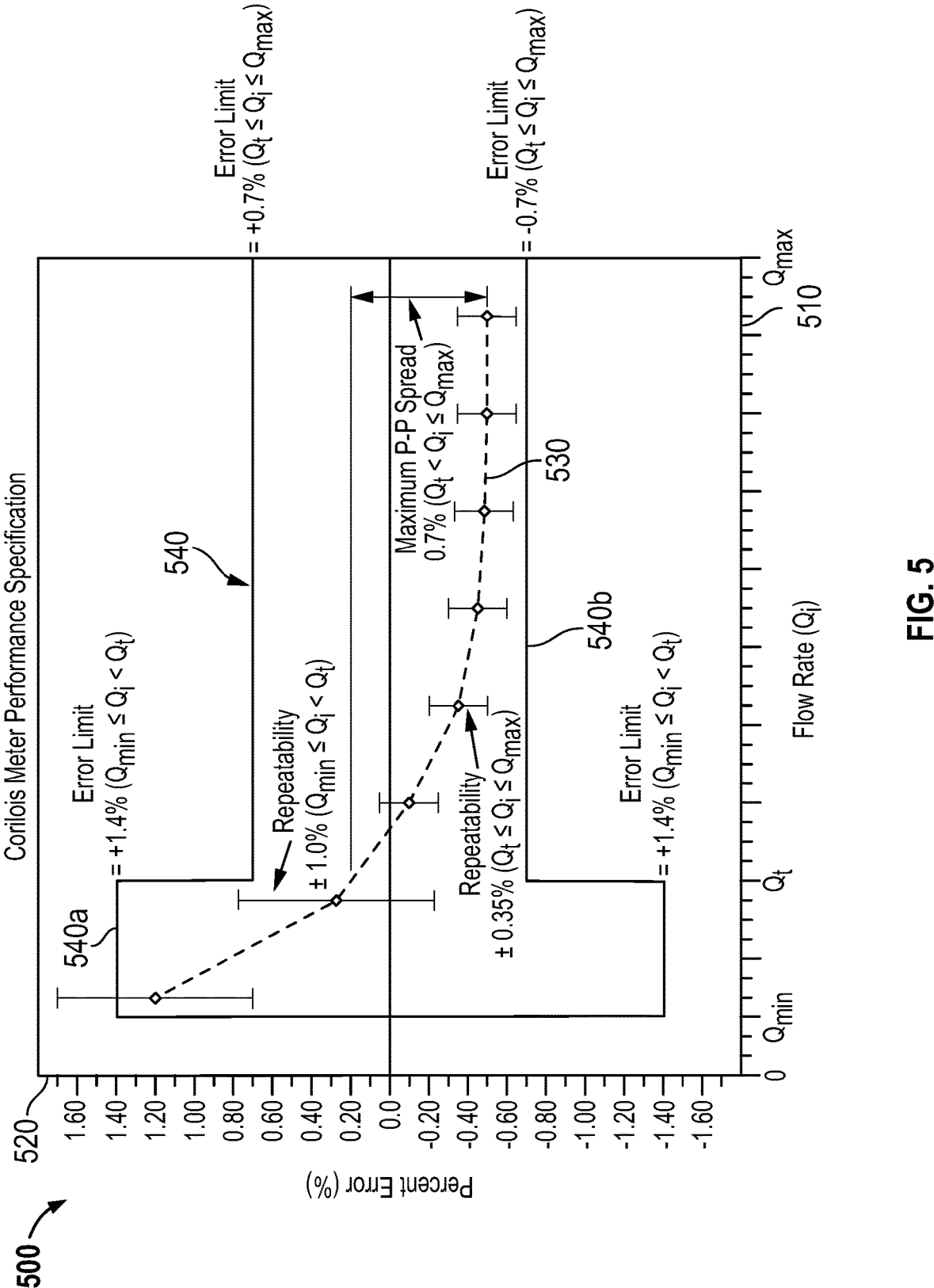
FIG. 5 shows a graph 500 illustrating an AGA 11 standard for tolerances about a flow rate measurement.

FIG. 5 shows a graph 500 illustrating an AGA 11 standard for tolerances about a flow rate measurement. As shown in FIG. 5, the graph 500 includes a measured flow rate axis 510 and a percent error axis 520. The measured flow rate axis 510 may be in any suitable units, such as kilograms-per-min (kg/min). The measured flow rate axis 510 ranges from zero to a maximum flow rate $Q_{max}$. The percent error axis 520 ranges from –1.60 to 1.60, although any suitable range and/or units may be employed.

The graph 500 also includes an error plot 530 illustrating an exemplary error-to-flow rate relationship of a Coriolis meter. The error plot 530 has associated repeatability bars for each corresponding flow rate illustrating ranges that measured values are expected to fall within. As can be seen, the error plot 530 decreases as flow rate increases with a notable improvement in measurement stability. As can also be seen, the repeatability bars and the error increases as the measured flow rate decreases. The increases in the repeatability bars and error may be due to an increasing contribution of non-linear effects on the flow rate measurements. Other error plots may be employed, including those with smaller increases or where the error is primarily linear due to, for example, the reference zero-flow value.

The graph 500 further includes an error limit band 540 having a low-flow error limit band 540a and a normal-flow error limit band 540b. The low-flow error limit band 540a and the normal-flow error limit band 540b are symmetrical about a zero-error rate axis. The low-flow error limit band 540a corresponds to a flow rate range between a minimum flow rate $Q_{min}$ and a threshold flow rate $Q_t$. The normal-flow error limit band 540b is for a flow rate between the threshold flow rate $Q_t$ and the maximum flow rate $Q_{max}$. As can be seen, the low-flow error limit band 540a has a larger error limit value than the normal-flow error limit band 540b.

To meet the AGA 11 standard, a Coriolis flow meter, such as the vibratory meter 5 discussed above, may have an error rate that is within the error limit band 540. However, due to the low-flow error limit band 540a having a larger error limit value than the normal-flow error limit band 540b, many users choose to not operate Coriolis meters at flow rates less than the threshold flow rate $Q_t$. As a result, an operational or effective turndown ratio of such a Coriolis flow meter is defined by the threshold flow rate $Q_t$ rather than the minimum flow rate $Q_{min}$. The error plot 530 may have non-zero error rates for various reasons, including a measurement bias associated with a reference zero-flow value. For example, in equation [1] described above, the zero-flow time delay $\Delta t_0$ may be an inaccurate zero-flow value for the Coriolis flow meter. As a result, the measured flow rate m may include a measurement bias caused by the reference zero-flow value.

Referring to FIG. 5, the error plot 530 may be improved by reducing an error rate represented by the error plot 530. For example, the error plot 530 may be shifted closer to the zero-error axis by reducing a measurement bias caused by the reference zero-flow value 422. Additionally, other routines, such as calibrations that determine the FCF, may compensate for nonlinear contributions to the error plot 530 at low flow rates. Accordingly, by shifting and flattening the error plot 530, the error plot 530 may be within the normal-flow error limit band 540b down to the minimum flow rate $Q_{min}$. As a result, a narrower error limit band may be employed for flow rates between the threshold flow rate $Q_t$ and the minimum flow rate $Q_{min}$.

Figure 1:
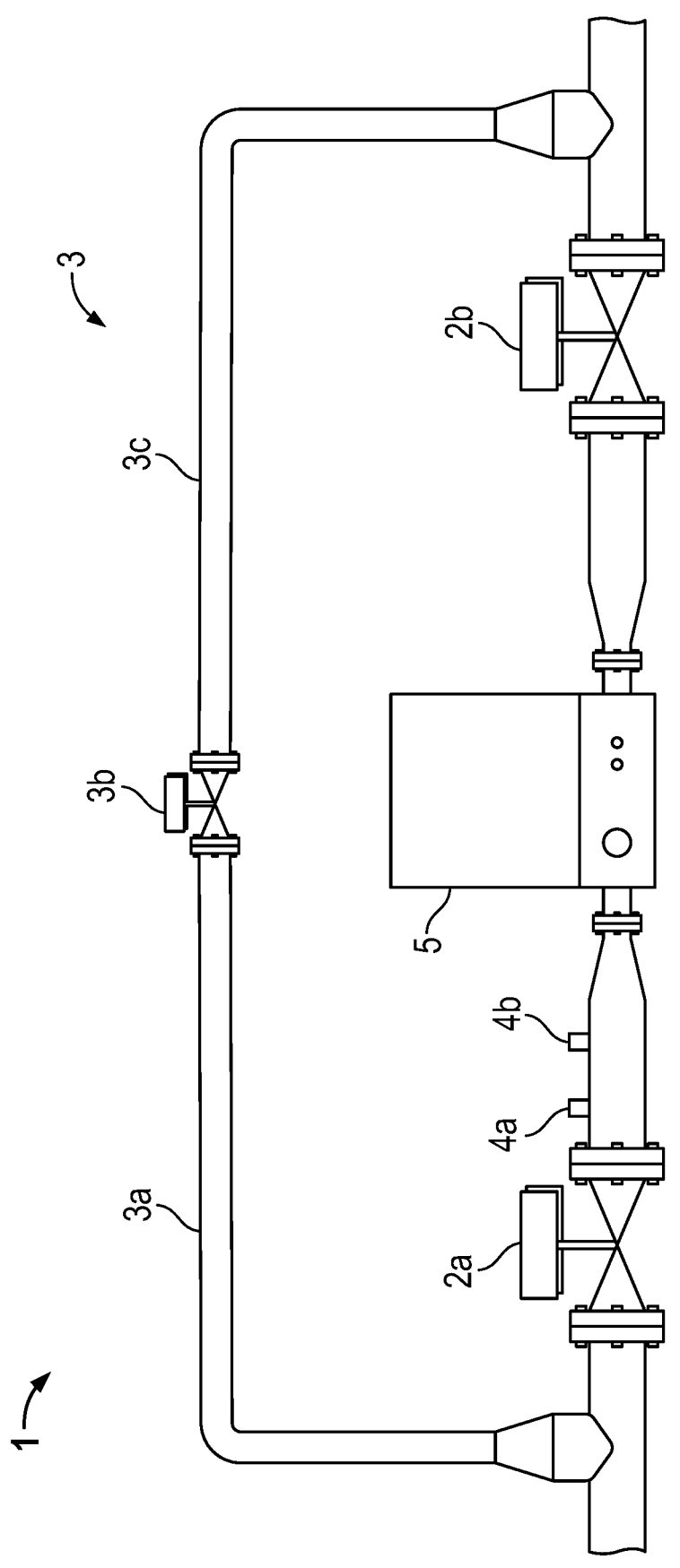
FIG. 1 shows a system 1 capable of performing a zero verification and a zero calibration of a vibratory meter 5.

The measurement bias associated with the reference zero-flow value can be eliminated by performing a zero calibration. The zero-calibration may be performed in the field by, with reference to FIG. 1, isolating the vibratory meter 5 and performing a zero-flow value calibration. More specifically, the vibratory meter 5 may be fluidly isolated such that there is zero flow through the vibratory meter 5 and accordingly it may be assumed that a measured zero-flow value is representative of zero flow.

A difference between the measured zero-flow value and the reference zero-flow value may be proportional to the measurement bias caused by the incorrect reference zero-flow value. To compensate for this measurement bias, the new measured zero-flow value may replace the reference zero-flow value that may be stored in the meter electronics 20. However, as can be appreciated, the measured zero-flow value may not be perfectly accurate. The following describes ways of determining that the measured zero-flow value is a reliable zero-flow value and therefore is an accurate measurement of a zero-flow value of a sensor assembly 10.

Figure 6:
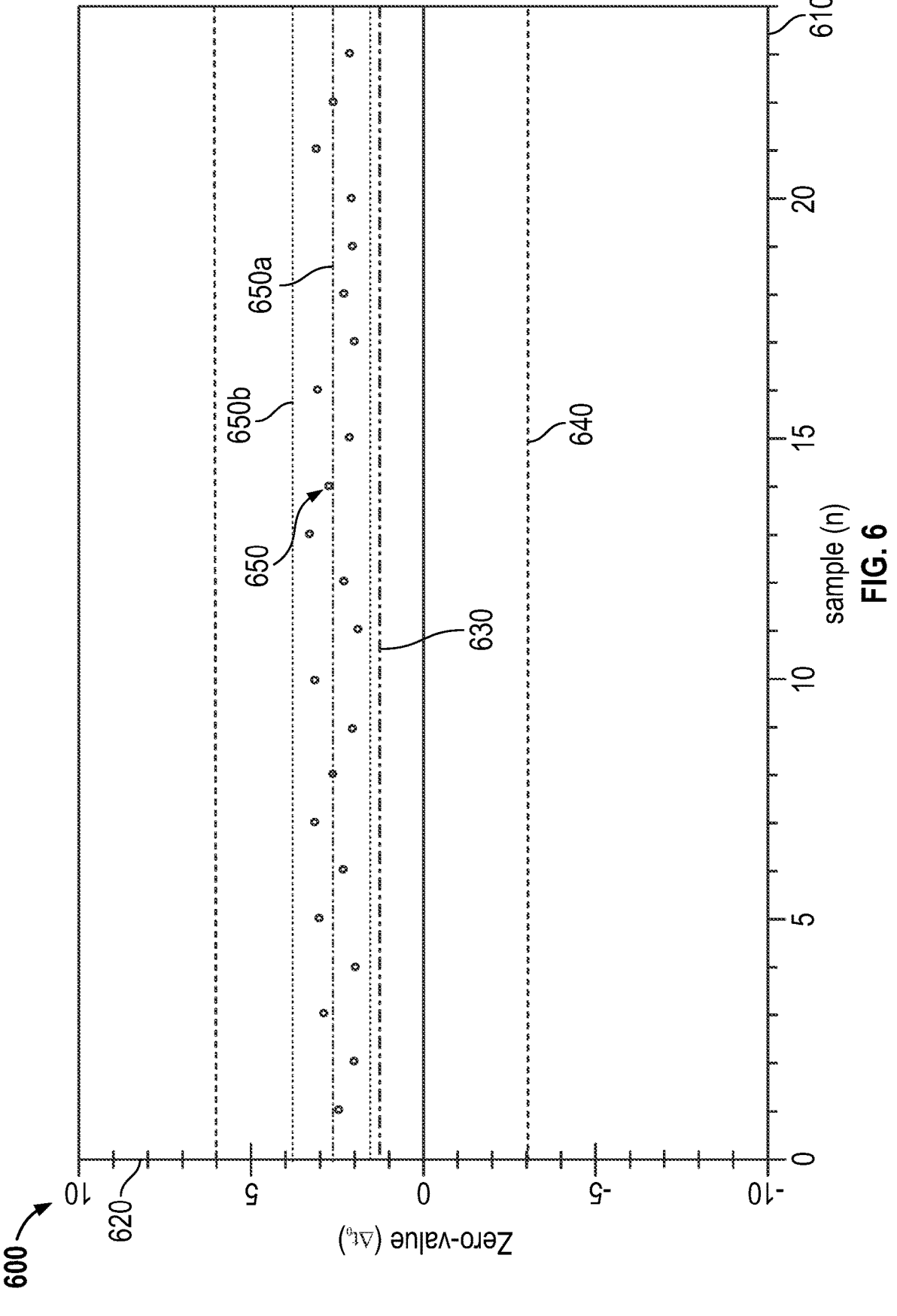
FIG. 6 shows a zero-verification graph 600 illustrating a zero verification of the vibratory meter 5.

FIG. 6 shows a zero-verification graph 600 illustrating a zero verification of the vibratory meter 5. As shown in FIG. 6, zero-verification graph 600 includes a sample axis 610 and a zero-flow value axis 620. The sample axis 610 is unitless but is illustrated as being in a time-domain. Accordingly, each tic mark of the sample axis 610 represents a sample-time. The zero-flow value axis 620 is shown as being represented by a time-delay $\Delta t_0$ term, which is in units of time, although any suitable zero-flow value, such as a phase difference, may be employed. The units of zero-flow value axis 620 may be nanoseconds, although any suitable units may be employed, such as phase or angle related units.

The zero-verification graph 600 also shows a reference zero-flow value 630 and a corresponding zero-stability value 640. The zero-stability value 640 is shown as a tolerance band about the reference zero-flow value 630. The zero-stability value 640 represents a verification criteria that may be a first zero-verification criteria. In other words, if all the measured zero-flow values are within the band representing the zero-stability value 640, then the vibratory meter 5 may be considered as being good for a first application associated with the first zero-verification criteria. The first zero-verification criteria may be associated with liquid measurements in non-custodial transfers.

The zero-verification graph 600 also includes zero-flow value measurements 650 represented by circular dots. The zero-flow value measurements 650 may represent zero-flow value measurements made as described above with reference to FIG. 1 above. As can be seen, the zero-flow value measurements 650 are consistently greater than the reference zero-flow value 630. Accordingly, the zero-flow value measurements 650 indicates that the reference zero-flow value 630 can cause a measurement bias in flow rate measurements made according to the above equation [1]. A mean 650a and a confidence interval 650b, which will be discussed in more detail below, determined from the zero-flow value measurements 650 are also shown.

A bias indicator may prove that a difference between the reference zero-flow value 630 and the zero-flow value measurements 650 is due to the reference zero-flow value 630 being inaccurate. The bias indicator for the reference zero-flow value 630 may be comprised of any value or values that indicate a new zero-flow value may reduce or eliminate the measurement bias in flow rate measurements caused by the reference zero-flow value 630. The following discussion provides examples of a bias indicator of the reference zero-flow value 630.

A signum ratio is a ratio of the number of positive or negative values or signums relative to the total number of values. The signum ratio may be referred to as a positive signum ratio if the counted signums are positive or a negative signum ratio if the counted signums are negative. As shown in FIG. 6, a plurality of differences between the zero-flow value measurements 650 and the reference zero-flow value 630 are all positive values. Accordingly, the positive signum ratio of the plurality of differences is 100%. The negative signum ratio is 0%. If either signum ratio is greater than a bias indicator reliability threshold value, then a mean value determined from the zero-flow value measurements 650 may be used as a new reference zero-flow value to reduce or eliminate the measurement bias caused by the reference zero-flow value 630 being inaccurate. Additionally or alternatively, the new reference zero-flow value may be determined by performing a zero calibration.

By way of example, the bias indicator reliability threshold value for a signum ratio may be a predetermined value of 75%. The zero-flow value measurements 650 are all greater than the reference zero-flow value 630. Accordingly, as discussed above, the signum ratio of the plurality of differences between the zero-flow value measurements 650 and the reference zero-flow value 630 is 100% positive. This is greater than 75% and therefore a mean value 650a calculated from the zero-flow value measurements 650 may be used as a reference zero-flow value to reduce or eliminate a measurement bias caused by the reference zero-flow value 630.

Statistical methods that calculate the probability of an outcome can be used to calculate a bias indicator in the vibratory meter. For example, P and T statistics may be employed to test whether a null hypothesis is met for a given set of data. Rejecting the null hypothesis does not determine if a condition exists in the vibratory meter, but that it is false that there is a lack of the condition. In the case of zero verification, the null hypothesis may be defined as: "the current zero-flow value is the same as the reference zero-flow value." If this null hypothesis is disproven, then it can be assumed that a current zero-flow value is not the same as the reference zero-flow value and therefore the reference zero-flow value will cause a measurement bias in a flow rate measurement.

By way of illustration, in a t-test, a t-value may be calculated using the following equation:

$$r = \frac{\bar{x} - \mu_0}{s/\sqrt{n}}, \tag{2}$$

where:
  $\mu_0$ is some specified value;
  $\bar{x}$ is a sample mean;
  s is a sample standard deviation; and
  n is the sample size.

In the context of zero verification, $\mu_0$ is a reference zero-flow value, such as the zero-flow time delay $\Delta t_0$ discussed above with reference to equation [1] above. Zero-flow value measurements can be used to calculate the sample mean $\bar{x}$ and the sample standard deviation s for comparison with the reference zero-flow value. The number of zero-flow value measurements is the sample size n. The t-test also typically includes a degree-of-freedom, which, for the above equation [2], is defined as n−1.

As discussed above, the t-test can be used to test a null hypothesis, which, for zero verification, may be defined as whether the sample mean $\bar{x}$ is equal to the reference zero-flow value. To test the null hypothesis, a P-value may be calculated using a known distribution of the t-value. To test the null hypothesis, the P-value is compared to a significance level $\alpha$. The significance level $\alpha$ is typically set to a small value, such as, for example, 0.01, 0.05, or 0.10. If the P-value is less than or equal to the significance level $\alpha$, then the null hypothesis is rejected for an alternative hypothesis. Since the null hypothesis is defined as "the current zero verification result has the same mean as the baseline zero verification result", the alternative hypothesis is that the current zero verification does not have the same mean and, therefore, a change has occurred in the meter.

However, the P-value may be difficult to calculate with limited computing resources. For example, the P-value may be calculated on a computer workstation with an operating system and a statistical software but may not be easily calculated in an embedded system. The meter electronics 20 described above may be an embedded system with limited computational resources.

To this end, a confidence interval that exploits the meter electronics' 20 limited computing resources may be used instead of the P-value. As a result, the confidence interval can be calculated using the embedded code on the meter electronics 20. For example, the meter electronics 20 can have a current zero-flow value and a zero standard deviation value stored in two registers. As can be appreciated, the t-value described above can be calculated using the current zero-flow value by using a significance level $\alpha$ and a degree-of-freedom. By way of example, the significance level $\alpha$ may be set at 0.01, which is a 99% confidence level. The number of zero verification tests may be set as 10. Accordingly, the degree-of-freedom is determined to be 9. A two-tailed student t-value can be calculated from the significance level $\alpha$ and the degree-of-freedom using a student t-value function as follows:

$$t_{Student,99,9} = tinv(.01, 9) = 3.25. \qquad [3]$$

A standard deviation of measured zero-flow values can be determined. A standard error may also be calculated, which is defined as follows:

$$stderror = \sqrt{\frac{(2 \cdot (stddev)^2)}{n_{DOF}}} \qquad [4]$$

$$stderror = \sqrt{2/9} \cdot \sqrt{stddev^2}.$$

A confidence interval range can be calculated using the above determined standard error and the t-value as follows:

$$CI_{range} = stderror \cdot t_{Student,99,9}; \qquad [5]$$

$$CI_{range} = stderror \cdot 3.25.$$

Finally, the confidence interval can be calculated using the zero-flow value mean and the confidence interval range, which is shown in the following:

$$CI = \text{zero value}_{mean} \pm CI_{range}. \qquad [6]$$

In the above example, the confidence level of 99% may be used to calculate the confidence interval, which can be compared to a bias indicator reliability threshold value. For example, the confidence interval can be used to test the null hypothesis by determining if the confidence interval includes 0.0. If the confidence interval does include 0.0, then the null hypothesis is not rejected and the zero verification indicates that the reference zero-flow value does not cause a measurement bias. If the confidence interval does not include 0.0, then the null hypothesis may be rejected and a zero verification fault may be sent, the mean of the zero-flow value measurements 650 may be saved as a new reference zero-flow value, a new calibration may be performed, or the like. Accordingly, the confidence interval can be used to test the null hypothesis with a desired confidence level.

In addition to the confidence interval, a bias dead band may be defined around zero. This bias dead band in the t-test is a value around zero for which a small bias with a small variation, that would otherwise cause the confidence interval check to reject the hypothesis, does not reject the hypothesis. Accordingly, this bias dead band can be set to a value that reduces the number of false bias indicators in the reference zero-flow value.

In the example of a confidence interval that is compared to zero, the bias dead band is a range around zero where, if zero is not within the confidence interval but a portion of the bias dead band is within the confidence interval, then the null hypothesis will not be rejected. Mathematically, this test can be expressed as whether the mean zero-flow value is less than the bias dead band. Or using the above discussed nomenclature: if $\bar{x} < db_{bias}$, where $db_{bias}$ is the bias dead band, then the null hypothesis cannot be rejected.

The bias dead band can be implemented alone or in conjunction with other dead bands. For example, the bias dead band can be implemented in conjunction with a variation dead band. In one example, the variation dead band can be determined from $db_{variation} = db_{bias}/t_{student, 99,8}$, where the $db_{variation}$ is the variation dead band. The variation dead band may be compared with a zero-flow value standard deviation to determine if the null hypothesis should be rejected. In an example, the bias dead band may be compared as discussed above and the variation dead band can be compared to the zero-flow value standard deviation as follows: if $\bar{x} < db_{bias}$ and if $s < db_{variation}$, then the null hypothesis cannot be rejected. The foregoing test can be utilized after the null hypothesis has been rejected by the confidence interval check. Alternatively, if $\bar{x} < db_{bias}$ and if $s < db_{variation}$, then the zero-flow value mean $\bar{x}$ is set to zero and a zero-flow value variation is to be equal to the variation dead band.

The reference zero-flow value 630 may be updated, replaced, or the like when the bias indicator shows that the reference zero-flow value 630 may be replaced by a zero-flow value that can reduce or eliminate a measurement bias caused by the reference zero-flow value 630. Accordingly, the meter electronics 20 may be configured to update or replace the reference zero-flow value 630 by, for example, saving a mean of the zero-flow value measurements 650, initiate a zero-calibration routine to determine a new zero-flow value, or the like. A zero-calibration routine to obtain a new reference zero-flow value may be advantageous over the zero-flow value measurements 650 because the zero-calibration routine may include additional quality control steps/features. Moreover, additional calibration steps may be performed, such as a recalculation of the FCF.

By reducing or eliminating a measurement bias, along with other routines that reduce or eliminate non-linear contributions at low flow rates, an error plot improved from the error plot 530 shown in FIG. 5 may be within the normal-flow error limit band 540*b*, or even a more stringent error limit band, at flow rates down to the minimum flow rate $Q_{min}$. Accordingly, a zero-verification criteria associated with the normal-flow error limit band 540*b* may be employed for applications having flow rates that are less than the threshold flow rate $Q_t$. As can be appreciated, this can improve an effective turn-down ratio (i.e., increased to a ratio of the maximum flow rate $Q_{max}$ and the minimum flow rate $Q_{min}$) of the vibratory meter 5.

A particular application having lower performance needs may be associated with a laxer zero-verification criteria. An exemplary application with lower performance needs may be non-custodial conveyances of a liquid. An application or process with higher performance requirements may have an associated zero-verification criteria that is comprised of, for example, a zero-stability value that is less than the zero-stability value that is used in the laxer zero-verification criteria discussed above. An exemplary high-performance application may be a custodial transfer of a gas, such as custodial transfers of natural gas at the point of consumption.

The more stringent zero-verification criteria may also include a bias indicator reliability threshold value for the bias indicator of the reference zero-flow value. For example, a central tendency value and a dispersion value associated with the zero-flow value measurements 650 may be determined and compared to the reference zero-flow value. In one example, the central tendency value associated with the zero-flow value measurements 650 may be a mean of a plurality of differences between the zero-flow value measurements 650 and the reference zero-flow value. The dispersion value associated with the zero-flow value measurements 650 may be, for example, the confidence interval 650*b* about the mean 650*a* of the plurality of differences between the zero-flow value measurements 650 and the reference zero-flow value. As explained above, the confidence interval 650*b* may be determined using a confidence level (e.g., 99%, 95%, etc.). The confidence interval 650*b* may be compared to a bias indicator reliability threshold, which can be zero or a dead band around zero in a null hypothesis t-test described above.

The zero-verification criteria may be determined by the meter electronics 20 based on properties of the fluid. For example, the zero-verification criteria scale may also be determined based on whether the fluid is gas or liquid. For example, if the zero-stability value 640 is associated with non-custodial conveyances of a liquid, a more stringent zero-verification criteria for custodial transfers of a gas can be calculated by scaling the zero-stability value 640 by a zero-verification criteria scale of, for example, 0.5, although any suitable value may be employed. Other properties of the fluid may be used to determine the zero-verification criteria scale, such as, for example, a measured density.

More specifically, a density of the fluid contained by the vibratory meter 5 may be measured and compared to a density value threshold. If the measured density is less than the density value threshold, then a first zero-verification criteria may be selected. If the measured density is greater than the density value threshold, then a second zero-verification criteria may be selected. The first zero-verification criteria may be suitable for higher performance applications and the second zero-verification criteria may be suitable for lower performance applications. The density value threshold may be selected, input, chosen, or the like, by the user. More density value thresholds may be employed. For example, there may be two or more density value thresholds defining density value ranges that are respectively associated with additional zero-verification criteria values. Accordingly, two or more zero-verification criteria may be selected.

One of the zero-verification threshold criteria may be stored in memory or scaled from another zero-verification criteria. For example, referring to FIG. 5, the error limit band 540 has different values based on the flow rate of the fluid. With more specificity, the low-flow error limit band 540*a* has a value that is about double a value of the normal-flow error limit band 540*b*. As can be appreciated, the zero-verification criteria associated with the low-flow error rate limit 540*a* may be more or less stringent depending on the particular application and a value of the zero-verification criteria may be proportional to a ratio of the low-flow error limit band 540*a* and the normal-flow error limit band 540*b*.

Accordingly, the zero-stability value 640 shown in FIG. 6 may be scaled (e.g., multiplied by a zero-verification criteria scale) according to whether the vibratory meter 5 is being employed in a higher or lower performance application. For example, if the zero-stability value 640 shown in FIG. 6 is associated with the low-flow error limit band 540*a*, then the zero-stability value 640 may be multiplied by 0.5 in the meter electronics 20 to determine a smaller zero-stability value about the reference zero-flow value 630. As an example, this might be done for the purpose of achieving accurate measurement within the normal-flow error limit band 540*b* down to a lower flow rate in order to improve the $Q_t$ flow rate to a lower flow rate value, thus expanding the usable flow rate range of the meter in an application. As can appreciated from FIG. 5, the zero-verification scale may be dependent on an expected flow rate of the fluid.

As discussed above, the zero-verification criteria can be comprised of or include a bias indicator reliability threshold value of a reference zero-flow value, such as the reference zero-flow value 630. The bias indicator can be compared to the bias indicator reliability threshold value. The bias indicator can be determined using a central tendency value and a dispersion value associated with, for example, the zero-flow value measurements 650. As shown in FIG. 6, the central tendency value is the mean 650*a* and the dispersion value is the confidence interval 650*b*.

Additionally or alternatively, the appropriate zero-verification criteria may be selected based on a property of the fluid in the vibratory meter 5. For example, the zero-verification criteria may be selected based on a determination of whether the application is a custodial transfer of a gas. The selection standard in this example may be determining if a measured density is less than a gas density threshold and determining if the vibratory meter 5 is to be used in a custodial transfer. If these are both true, then a more stringent zero-verification criteria may be selected.

As can be appreciated, the selection of the zero-verification criteria may be automated. More specifically, the user may only need to store a value in the meter electronics 20 indicating that the vibratory meter 5 is being used in a custodial transfer. The meter electronics 20 may therefore be configured to determine, for example, that the vibratory meter 5 is measuring a liquid for a custodial transfer and therefore a smaller zero-stability value about the reference zero-flow value may be employed during zero verification without determining a bias indicator of the reference zero-flow value.

Figure 7:
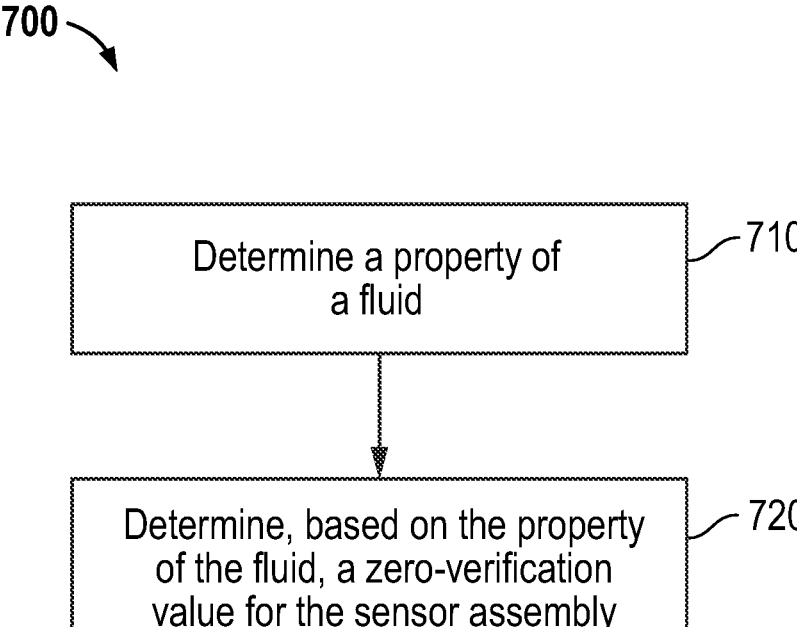
FIG. 7 shows a method 700 of determining a zero-verification criteria for a zero verification of a vibratory meter.

FIG. 7 shows a method 700 of determining a zero-verification criteria for a zero verification of a vibratory meter. As shown in FIG. 7, the method 700 determines a property of the fluid in step 710. The fluid may be contained in a sensor assembly, such as the sensor assembly 10 described above, although any suitable sensor assembly may be employed. The method 700, in step 720, may determine, based on the property of the fluid, a zero-verification criteria value for the sensor assembly. The property of the fluid may be a measured property of the fluid while the fluid is contained within the sensor assembly in a no-flow condition. For example, the property of the fluid may be one of a density and a phase of a fluid.

The zero-verification criteria value may be a first zero-verification criteria value determined by multiplying a second zero-verification criteria value with a factor. For example, the ratio discussed above with reference to FIG. 5 may be multiplied with the second zero-verification criteria to determine the first zero-verification criteria. This exemplary ratio may be determined based on a first tolerance associated with a first expected flow rate of the fluid and a second tolerance associated with a second expected flow rate of the fluid.

The zero-verification criteria value may be one of a bias indicator reliability threshold value and a zero-stability value of a reference zero-flow value. For example, where a bias indicator is used to perform zero verification, the bias indicator reliability threshold value may be used to determine if a reference zero-flow value may include a bias that can affect flow rate measurements. Additionally or alternatively, the zero-stability value may be used to determine if the measured zero-flow values are within the zero-stability value.

Accordingly, a vibratory meter, such as the vibratory meter 5 described above, may be configured to measure a flow rate of a fluid using a zero-flow value. The vibratory meter may include a sensor assembly, such as, for example, the sensor assembly 10 described above, that is configured to measure a fluid and a meter electronics 20 communicatively coupled to the sensor assembly 10. The meter electronics 20 may be configured to determine a property of the fluid and determine, based on the property of the fluid, a zero-verification criteria value for the sensor assembly.

The vibratory meter 5, meter electronics 20, and method 700 described above may determine a zero-verification criteria for zero-verification of a vibratory meter, such as the vibratory meter 5 described above. For example, the vibratory meter may include a sensor assembly configured to measure a fluid. As explained above, the fluid may be gas or liquid and may be used in various processes that may have differing measurement tolerances, such as flow rate measurement tolerances. The differing measurement tolerances may be determinable from a property of the fluid. Accordingly, the vibratory meter may also include a meter electronics communicatively coupled to the sensor assembly. The meter electronics 20 may be configured to determine a property of the fluid and determine, based on the property of the fluid, a zero-verification criteria value for the sensor assembly.

Because the zero-verification criteria value is determined based on the property of the fluid, the zero-verification criteria value may be more suitable for a given process or application. For example, the zero-verification criteria value may be associated with custodial transfers of gas, which may have a density value that is less than a density value threshold. Accordingly, the zero-verification criteria value associated with the custodial transfers of gas may be suitable for measurement tolerances about flow rate measurements of the custodial transfers of the gas.

In one example, the zero-verification criteria value may be determined by multiplying another zero-verification criteria value by a zero-verification criteria scale, where this second zero-verification criteria value is associated with more lax tolerances about flow rate measurements. Using the zero-verification criteria scale may be more efficient and require fewer computing resources than, for example, storing different zero-verification criteria values for various processes or applications. Accordingly, a zero-verification criteria value suitable for more lax tolerances about flow rate measurements may be a base zero-verification criteria value that is used to calculate other zero-verification criteria values that are suitable for more strict tolerances about the measurement flow rates.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other vibratory meters, meter electronics methods for determining a zero-verification criteria for zero verification of the vibratory meter and not just to the embodiments described above and shown in the accompanying figures. Accordingly, the scope of the embodiments described above should be determined from the following claims.

We claim:

1. A meter electronics (20) for determining a zero-verification criteria for a zero-verification of a vibratory meter (5), the meter electronics (20) comprising:

an interface (401) communicatively coupled to a sensor assembly (10) containing a fluid; and a processing system (402) communicatively coupled to the interface (401), the processing system (402) being configured to determine a property of the fluid and determine, based on the property of the fluid and a selected zero-verification criteria, a zero-verification criteria value for the sensor assembly (10).

2. The meter electronics (20) of claim 1, wherein the processing system (402) being configured to determine the property of the fluid comprises the processing system (402)

being configured to measure the property of the fluid while the fluid is contained within the sensor assembly in a no-flow condition.

3. The meter electronics (20) of claim 1, wherein the property of the fluid is one of a density and a phase of a fluid.

4. The meter electronics (20) of claim 1, wherein the processing system (402) being configured to determine, based on the fluid property of the fluid and the selected zero-verification criteria, the zero-verification criteria value comprises the processing system (402) being configured to determine a first zero-verification criteria value by multiplying a second zero-verification criteria value with a factor.

5. The meter electronics (20) of claim 4, wherein the factor is a ratio determined based on a first tolerance associated with a first expected flow rate of the fluid and a second tolerance associated with a second expected flow rate of the fluid.

6. The meter electronics (20) of claim 1, wherein the zero-verification criteria value is at least one of a bias indicator reliability threshold value and a zero-stability value of a reference zero-flow value.

7. A method of determining a zero-verification criteria for a zero verification of a vibratory meter, the method comprising:
    containing a fluid in a sensor assembly;
    determining a property of the fluid; and
    determining, based on the property of the fluid and a selected zero-verification criteria, a zero-verification criteria value for the sensor assembly.

8. The method of claim 7, wherein the property of the fluid is a measured property of the fluid while the fluid is contained within the sensor assembly in a no-flow condition.

9. The method of claim 7, wherein the property of the fluid is one of a density and a phase of a fluid.

10. The method of claim 7, wherein determining, based on the property of the fluid and the selected zero-verification criteria, the zero-verification criteria value comprises determining a first zero-verification criteria value by multiplying a second zero-verification criteria value with a factor.

11. The method of claim 10, wherein the factor is a ratio determined based on a first tolerance associated with a first expected flow rate of the fluid and a second tolerance associated with a second expected flow rate of the fluid.

12. The method of claim 7, wherein the zero-verification criteria value is at least one of a bias indicator reliability threshold value and a zero-stability value of a reference zero-flow value.

13. A vibratory meter (5) capable of determining a zero-verification criteria for performing a zero verification, the vibratory meter (5) comprising:
    a sensor assembly (10) containing a fluid; and
    a meter electronics (20) communicatively coupled to the sensor assembly (10), the meter electronics (20) being configured to determine a property of the fluid and determine, based on the property of the fluid and a selected zero-verification criteria, a zero-verification criteria value for the sensor assembly (10).

14. The vibratory meter (5) of claim 13, wherein the meter electronics (20) being configured to determine the property of the fluid comprises the meter electronics (20) being configured to measure the property of the fluid while the fluid is contained within the sensor assembly in a no-flow condition.

15. The vibratory meter (5) of claim 13, wherein the property of the fluid is one of a density and a phase of a fluid.

16. The vibratory meter (5) of claim 13, wherein the meter electronics (20) being configured to determine the zero-verification criteria value comprises the meter electronics (20) being configured to determine a first zero-verification criteria value by multiplying a second zero-verification criteria value with a factor.

17. The vibratory meter (5) of claim 16, wherein the factor is a ratio determined based on a first tolerance associated with a first expected flow rate of the fluid and a second tolerance associated with a second expected flow rate of the fluid.

18. The vibratory meter (5) of claim 13, wherein the zero-verification criteria value is at least one of a bias indicator reliability threshold value and a zero-stability value of a reference zero-flow value.

\* \* \* \* \*